(12) United States Patent
Vontell, Sr. et al.

(10) Patent No.: US 7,815,839 B2
(45) Date of Patent: Oct. 19, 2010

(54) HYBRID MANDRELS

(75) Inventors: John H. Vontell, Sr., Manchester, CT (US); Carl Brian Klinetob, Manchester, CT (US); Christopher John Feeney, Wallingford, CT (US)

(73) Assignee: United Technologies Corporation, East Hartford, CT (US)

( * ) Notice: Subject to any disclaimer, the term of this patent is extended or adjusted under 35 U.S.C. 154(b) by 318 days.

(21) Appl. No.: 11/782,867

(22) Filed: Jul. 25, 2007

(65) Prior Publication Data

US 2009/0026659 A1    Jan. 29, 2009

(51) Int. Cl.
*B29C 33/44* (2006.01)
*B29C 33/56* (2006.01)
*B29C 45/17* (2006.01)

(52) U.S. Cl. .......... 264/328.1; 249/122; 249/175; 249/183; 264/221; 425/438; 425/DIG. 10

(58) Field of Classification Search .......... 249/63, 249/64, 122, 144, 151, 175, 183; 425/468, 425/DIG. 10; 164/34, 35, 132; 264/221, 264/328.1
See application file for complete search history.

(56) References Cited

U.S. PATENT DOCUMENTS

| | | | | |
|---|---|---|---|---|
| 1,656,312 A * | 1/1928 | Black | ............ | 264/317 |
| 3,136,831 A * | 6/1964 | Zinn | ............ | 264/225 |
| 3,593,027 A * | 7/1971 | Grieger | ............ | 250/559.45 |
| 4,000,963 A * | 1/1977 | Thettu | ............ | 399/327 |
| 4,093,175 A * | 6/1978 | Putzer et al. | ............ | 249/153 |
| 4,242,160 A | 12/1980 | Pinter et al. | | |
| 4,621,787 A * | 11/1986 | Westberg | ............ | 249/63 |
| 4,681,724 A | 7/1987 | Faiz et al. | | |
| 4,743,481 A * | 5/1988 | Quinlan et al. | ............ | 428/35.7 |
| 5,012,853 A * | 5/1991 | Bihlmaier | ............ | 164/75 |
| 5,066,454 A * | 11/1991 | Hanson | ............ | 419/42 |
| 5,152,949 A | 10/1992 | Leoni et al. | | |
| 5,176,866 A * | 1/1993 | Tanaka et al. | ............ | 264/219 |
| 5,178,885 A | 1/1993 | Vallier et al. | | |
| 5,227,576 A | 7/1993 | Howard | | |
| 5,248,552 A * | 9/1993 | Moore et al. | ............ | 428/323 |
| 5,320,364 A | 6/1994 | Mistrater et al. | | |
| 5,346,367 A | 9/1994 | Doolin et al. | | |
| 5,681,518 A * | 10/1997 | Ashcraft | ............ | 264/221 |
| 5,803,151 A * | 9/1998 | Carden | ............ | 164/5 |
| 5,937,265 A | 8/1999 | Pratt et al. | | |
| 5,975,189 A * | 11/1999 | Nemoto | ............ | 164/132 |
| 6,087,411 A * | 7/2000 | Cox et al. | ............ | 521/189 |
| 6,270,710 B1 * | 8/2001 | Bartel et al. | ............ | 264/219 |
| 6,390,961 B1 * | 5/2002 | Nakada et al. | ............ | 492/56 |

(Continued)

OTHER PUBLICATIONS

John Donivan, "How to Make Vulcanized Rubber Molds", Article from Donivan & Maggiora website, http//www.donivanandmaggiora.com/info/RubberMolds/RubberMolds.html; 8 pp.

*Primary Examiner*—Yogendra N Gupta
*Assistant Examiner*—Emmanuel S Luk
(74) *Attorney, Agent, or Firm*—Carlson, Gaskey & Olds PC (57) ABSTRACT

A mandrel comprising a rigid inner core and an elastomeric outer layer that at least partially surrounds the rigid inner core, wherein the elastomeric outer layer is adapted to expand during a molding process to seal a cavity to prevent incursion of material injected during the molding process.

20 Claims, 5 Drawing Sheets

U.S. PATENT DOCUMENTS

| | | |
|---|---|---|
| 6,605,802 B2 * | 8/2003 | Nagahira .................... 219/619 |
| 6,910,359 B2 | 6/2005 | Nelepovitz et al. |
| 7,147,895 B2 | 12/2006 | Cundiff et al. |
| 7,329,375 B2 * | 2/2008 | Murphy et al. .............. 264/248 |
| 7,344,670 B2 * | 3/2008 | Schmidt ..................... 264/317 |
| 2002/0056944 A1 * | 5/2002 | Lee et al. .................... 264/313 |

* cited by examiner

HYBRID MANDRELS

STATEMENT REGARDING FEDERALLY SPONSORED RESEARCH OR DEVELOPMENT

The U.S. government has a paid-up license in this invention and the right in limited circumstances to require the patent owner to license others on reasonable terms as provided for by the terms of N00019-02-C-3003 awarded by the Joint Program Office (JPO) of the U.S.

BACKGROUND

1. Field of the Invention

The present disclosure generally relates to mandrels. More particularly, the present disclosure relates to mandrels that provide hydraulic sealing during injection molding.

2. Description of the Related Art

Components, such as jet turbine components, are often formed using molding processes. For example, a material in liquid form may be pumped or injected into a tooling whose inner surfaces will define the outer periphery of the component. The material solidifies within the tooling and then may be removed as a solid component. In some embodiments in which the component is to be formed as a composite component, fiber material, such as sheets of fiberglass, is laid within the tooling and liquid resin is then injected into the tooling and cured to form a solid composite component.

In co-molding processes, pre-formed parts are further provided within the tooling before material is injected into the tooling. In such cases, the pre-formed parts can be integrated into the component that is being formed. When a pre-formed part includes a cavity that is not to be filled with the injected material during the molding process, a mandrel may be used to occupy the cavity to prevent the material from flowing into the cavity.

Currently, there are various different types of mandrels that are used in molding processes, including cast ceramic mandrels, salt mandrels, low-melt alloy mandrels, trapped rubber mandrels, and machined metal mandrels. None of those mandrels, however, provide all of the properties that may be desired in a mandrel, particularly when a cavity is to be is isolated. Such properties can include, for example, sufficient rigidity during mandrel insertion, sufficient mechanical support and hydraulic sealing during the molding process, low mechanical stress during mandrel removal, and the absence of mandrel residue after mandrel removal.

SUMMARY

In one embodiment, the present disclosure relates to a mandrel comprising a rigid inner core and an elastomeric outer layer that at least partially surrounds the rigid inner core, wherein the elastomeric outer layer is adapted to expand during a molding process to seal a cavity to prevent incursion of material injected during the molding process.

BRIEF DESCRIPTION OF THE DRAWINGS

The disclosed mandrels can be better understood with reference to the following drawings. The components in the drawings are not necessarily to scale.

DETAILED DESCRIPTION

As described in the foregoing, current mandrels do not comprise all of the properties that may be desired in a mandrel, such as sufficient rigidity during mandrel insertion, sufficient mechanical support and hydraulic sealing during the molding process, low mechanical stress during removal, and the absence of mandrel residue after removal. As described in the following, however, such properties can be obtained when a hybrid mandrel including a rigid inner core and an elastomeric outer layer is used.

Described in the following are hybrid mandrels, methods for forming hybrid mandrels, and methods for using hybrid mandrels for forming molded components. Although specific embodiments are presented, those embodiments are mere example implementations and it is noted that other embodiments are possible. All such embodiments are intended to fall within the scope of this disclosure.

Figure 1:
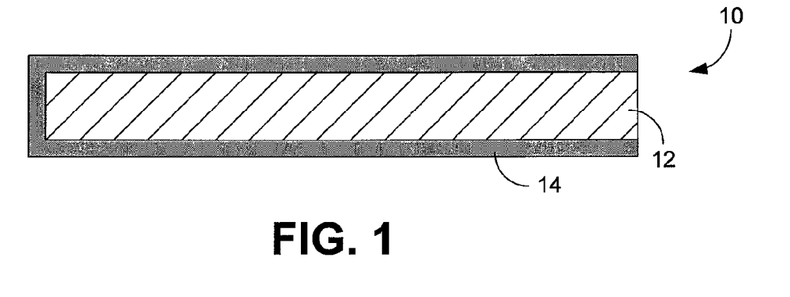
FIG. 1 is a schematic view of an embodiment of a hybrid mandrel.

Turning to the figures, in which like numerals identify corresponding components, FIG. 1 schematically illustrates an embodiment of a hybrid mandrel 10. As indicated in FIG. 1, the hybrid mandrel 10 generally comprises an inner core 12 and an outer layer 14 that at least partially surrounds the inner core. The inner core 12 comprises a rigid material that enables insertion of the mandrel 10 into a cavity within a tooling, for example a cavity of a pre-formed part to be inserted into the tooling, and that provides mechanical support to the mandrel during the molding process. In some embodiments, the inner core 12 is, at least partially, formed of a low melting point material. For the purposes of this disclosure, the term "low melting point material" means materials that melt at relatively low temperatures that are higher than the temperature at which material is cured within a tooling in which the mandrel 10 is used, but lower than the temperatures at which detrimental changes to the properties of the cured materials could occur. By way of example, the low melting point material melts at a temperature below 400° F. As described below, the low melting point of the material used to form the inner core 12 enables removal of the mandrel 10 without imparting mechanical stress on the cured component or the need for negative draft angles. Example materials include low-melt metals or metal alloys, which may comprise one or more of tin, zinc, lead, silver, and bizmuth.

As shown in FIG. 1, the outer layer 14 contacts and surrounds the inner core 12. In some embodiments, the outer layer 14 comprises an elastomeric material having a high coefficient of thermal expansion such that the outer layer has physical dimensions at room temperature that enable insertion of the mandrel 10 into a cavity without damage to any surfaces of the cavity and physical dimensions during material injection temperatures that would exceed the cavity dimensions (when measured in a free state). In some embodiments, the elastomeric material further exhibits sufficient elasticity to conform to the cavity surfaces and prevent any incursion of the material during the injection process, sufficiently low surface tension to enable gravity-melt removal of the inner core 12 without significant loss of flexibility, sufficient strength to enable removal of the remaining elastomeric material after melt out of the inner core, and sufficiently low bond strength to the cavity surfaces to enable complete removal of the elastomeric material without damage to the cavity surfaces. Example elastomeric materials include elastomers such as natural rubber, silicone rubber, urethane rubber, and fluoroelastomers such as Viton™ from DuPont.

Figure 2A:
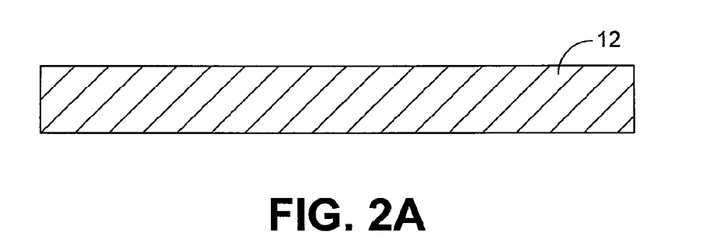
FIGS. 2A-2C are schematic views that illustrate steps of an embodiment of a method for forming the hybrid mandrel of FIG. 1.
Figure 2B:
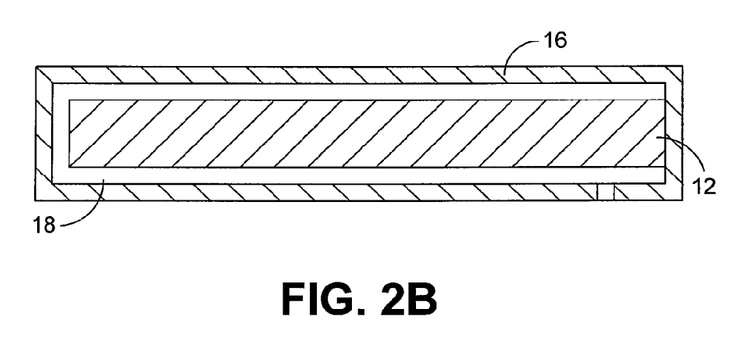
Figure 2C:
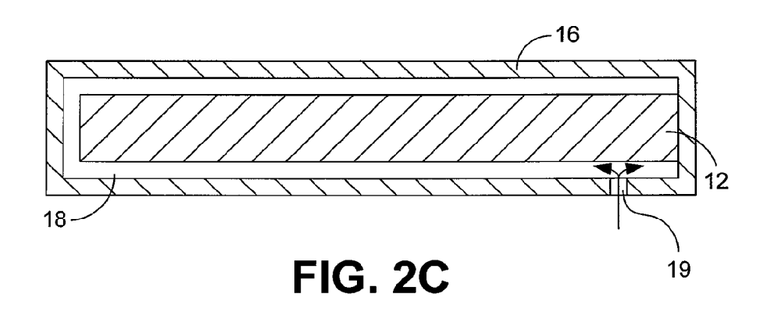

FIGS. 2A-2C illustrate steps of an embodiment of a method for forming the hybrid mandrel 10. Beginning with FIG. 2A, the core 12 is formed, for example through a casting process. Turning to FIG. 2B, the core 12 is placed within a die 16, for example, a steel ported die. Once placed within the die 16, the core 12 is separated from the die on multiple sides by a gap 18. Next, with reference to FIG. 2C, elastomeric material in liquid form is injected into the die 16 through a port 19 of the die and into the gap 18 so as to at least partially surround the core 12 and form an outer jacket, sleeve, or sheath. Once the elastomeric material solidifies, either due to cooling or curing, a hybrid mandrel 10 such as that illustrated in FIG. 1 results. In an alternative embodiment, the elastomeric material can be applied to the core 12 in liquid form and cured on the core.

Figure 3A:
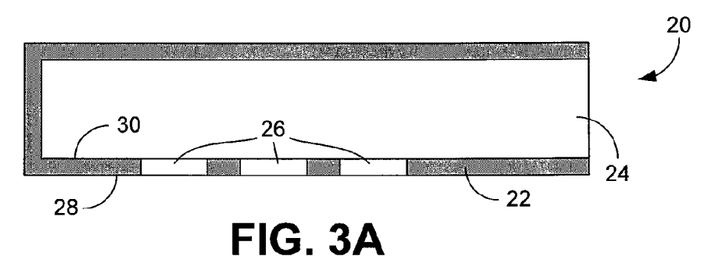
FIGS. 3A-3I are schematic views that illustrate steps of an embodiment of a method for forming a composite component through an injection molding process using the hybrid mandrel of FIG. 1.

FIGS. 3A-3I illustrate steps of an embodiment of a method for forming a composite component through an injection molding process, the method including use of the hybrid mandrel 10. Beginning with FIG. 3A, a pre-formed part 20, such as an electrical connector, is manufactured. In this example, the pre-formed part 20 is to be integrated with the component to be formed through the molding process and, therefore, is to be provided within a tooling that will be used to form the component. As indicated in FIG. 3A, the pre-formed part 20 includes a body 22 that defines a cavity 24 and that includes electrical contacts 26. In the embodiment of FIG. 3A, the contacts 26 extend through the body 22 from an outer surface 28 to an inner surface 30, the latter of which comprises a surface that defines the cavity 24.

Figure 3B:
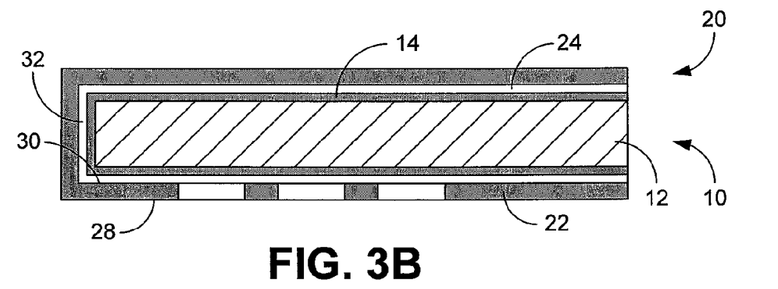
Figure 3C:
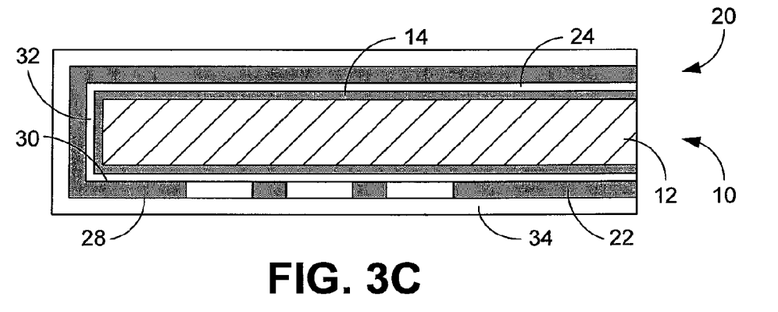
Figure 3D:
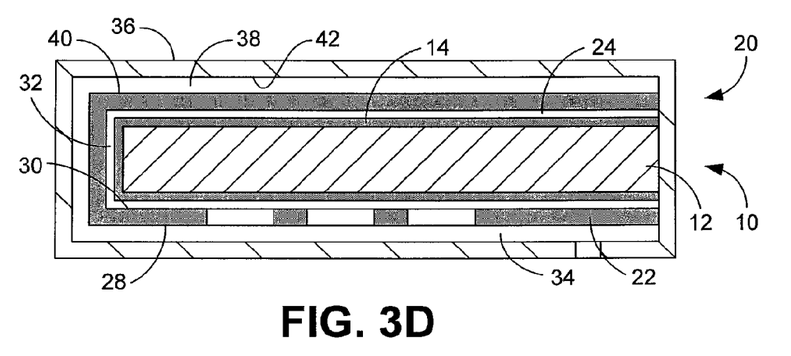

Turning to FIG. 3B, the hybrid mandrel 10 is inserted into the cavity 24 of the pre-formed part 20 such that there is a gap 32 that separates the mandrel from the inner surface(s) 30 of the cavity. Next, as indicated in FIG. 3C, composite reinforcement material 34, such as fiberglass fabric, is applied to the outer surface(s) 28 of the pre-formed part 20. Once the reinforcement material 34 has been applied, the pre-formed part 20 is inserted, along with the hybrid mandrel 10 and the reinforcement material, into a tooling 36, such as a steel ported die, as indicated in FIG. 3D. The reinforcement material 34 then occupies a gap 38 that exists between the outer surface(s) 40 of the pre-formed part 20 and the inner surface(s) 42 of the tooling 36.

Figure 3E:
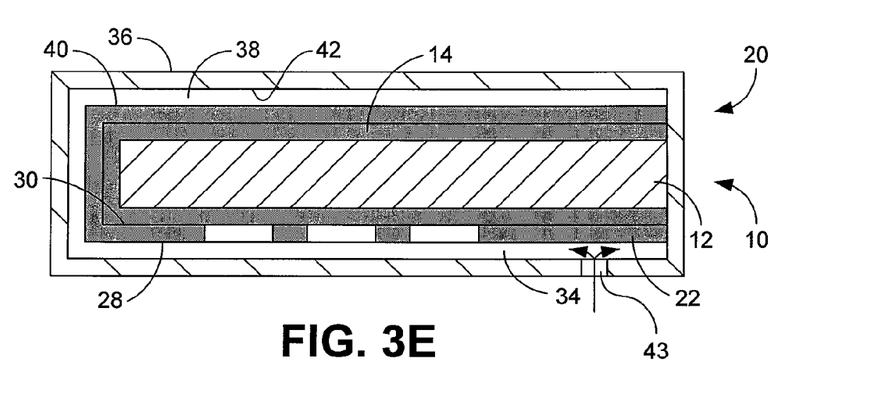
Figure 3F:
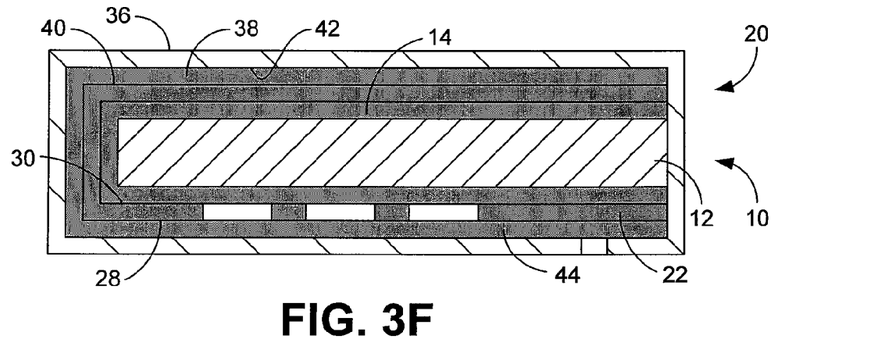

At this point, material in liquid form, such as resin, can be injected into the tooling 36 via a port 43, as indicated in FIG. 3E, so as to fill the gap 38 and infiltrate the reinforcement material 34. In some embodiments, the material is injected at an elevated temperature that, as depicted in FIG. 3E, causes core 12 and the elastomeric material of the outer layer 14 of the hybrid mandrel 10 to expand so as to fill the gap 32 (FIG. 3D) metal also expands of the cavity 24.

Figure 3G:
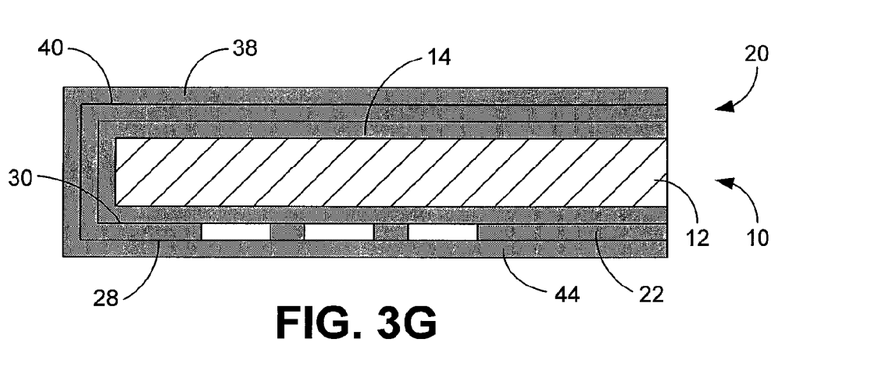
Figure 3H:
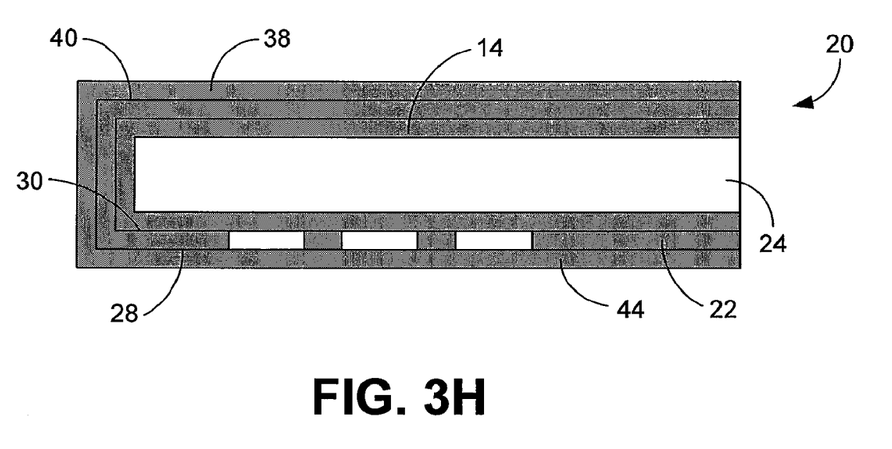
Figure 3I:
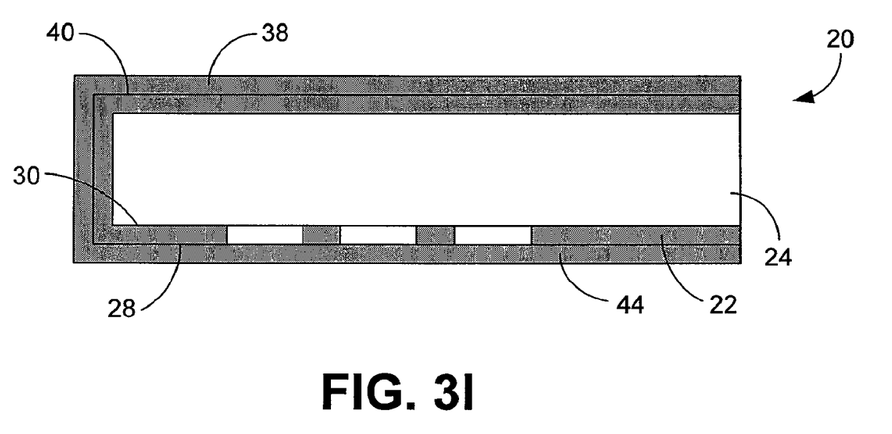

Next, the injected material is cured so as to form a solid composite component 44 (FIG. 3F) that can be removed from the tooling (FIG. 3G). At this point, the core 12 of the hybrid mandrel 10 can be removed, as shown in FIG. 3H. In some embodiments, the core 12 is, at least partially, gravity-melted out from the expanded outer layer 14 and the cavity 24 at an elevated temperature (e.g., a "post-cure" temperature) that is slightly higher than the temperature used during curing. After the core 12 has been removed, the outer layer 14 is removed, as indicated in FIG. 3I. In some embodiments, the outer layer 14 is simply pulled out from the cavity 24 as a single, unitary piece. In other embodiments, the outer layer 14 is removed using a solvent.

As can be appreciated from the above, the rigidity of the inner core provides sufficient strength to enable insertion of the mandrel into the cavity and maintain its position and shape within the cavity during injection molding. In addition, due to expansion of the outer layer, the mandrel hydraulically seals the cavity such that the injected material, such as resin, cannot enter the cavity or coat the contacts within the cavity. Furthermore, due to the low melting point of the material of the inner core, the mandrel can be easily removed without imparting mechanical stresses to the pre-formed part or the component in which the part is provided and without the adverse effects that high temperatures would have on the pre-formed part or the component. Moreover, due to the fact that the cavity surfaces are only contacted by the elastomeric material, no mandrel residue remains.

Figure 4A:
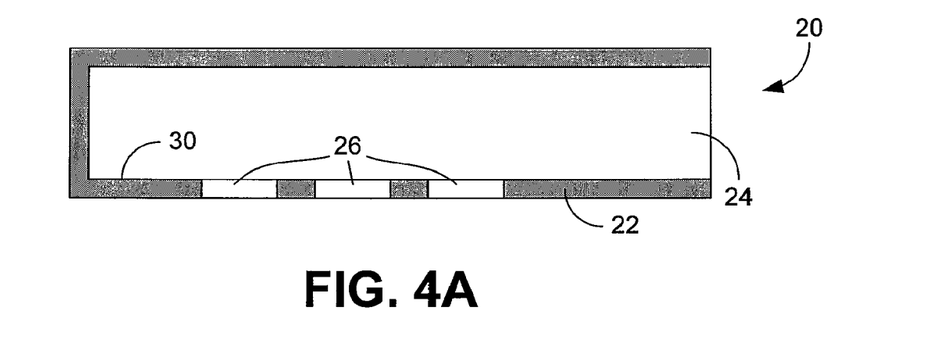
FIGS. 4A-4C are schematic views that illustrate steps of another embodiment of a method for forming a hybrid mandrel.
Figure 4B:
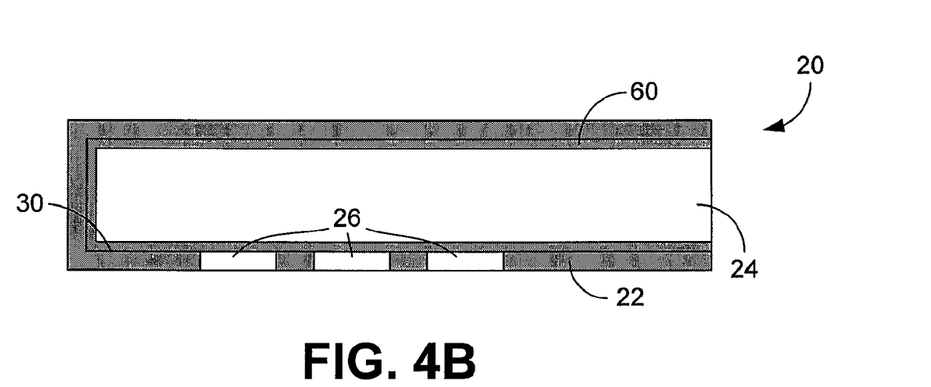
Figure 4C:
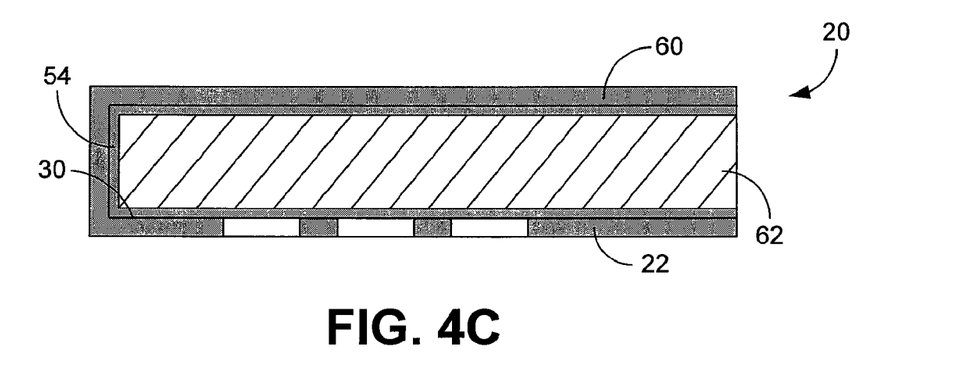

FIGS. 4A-4C illustrate steps of another embodiment of a method for forming a hybrid mandrel. In this method, the outer layer of the hybrid mandrel is formed within a cavity before the inner core is formed. Beginning with FIG. 4A, a pre-formed part 20 is manufactured that includes a body 22 that defines a cavity 24 that includes contacts 26 and an inner surface 30. Next, as indicated in FIG. 4B, an outer layer 60 is formed within the cavity 24. In some embodiments, the outer layer 60 can be formed as a bag and can be urged into contact with the inner surface(s) 30 of the cavity 24 using mechanical or fluid pressure. In other embodiments, the outer layer 60 is formed by applying elastomeric material in liquid form to the inner surface(s) 30 of the cavity 24 and then curing the material in place. Next, as indicated in FIG. 4C, the inner core 62 is formed by injecting the material of the core in liquid form into the outer layer 60 provided in the cavity 24. In some embodiments, the outer layer 60 and inner core 62 are formed within the pre-formed part 20 before the part is positioned in a tooling that will be used to form a component. In other embodiments, the outer layer 60 and inner core 60 are formed within the pre-formed part 20 after the pre-formed part has been positioned within the tooling.

In the following, various specific examples are provided that describe fabrication of a hybrid mandrel and/or a molded component formed using a hybrid mandrel.

EXAMPLE 1

A metal core is cast using a eutectic, low-melting tin/zinc alloy, such as Indalloy 201 from Indium Corporation, which melts at 390° F. The cast core is over-molded with a liquid injection moldable (LIM) silicone, such as SHINCOR KE-1950-30 from SHINCOR Silicones, to form a hybrid mandrel. The hybrid mandrel is then inserted into an electrical connector and a co-molding process, such as resin transfer molding (RTM), is performed. During the co-molding process, the over-molded silicone and core expands and seals the connector cavity, excluding all resin flow from the cavity. The resin is then cured. After curing, the molded component is heated to approximately 420° F. during post-curing, and the metal core is allowed to gravity-flow out of the cavity. After cooling, a silicone bag remains that is removed from the cavity, resulting in a connector cavity that is clean and functional.

EXAMPLE 2

A machined metal (e.g., steel) mandrel is surrounded with a layer of eutectic, low-melting tin/zinc alloy, such as Indalloy 201, in a casting process. The cast core is then overmolded with an LIM silicone, such as SHINCOR KE-1950-30, to form a hybrid mandrel. The hybrid mandrel is inserted into a premolded RTM insert cavity. During an RTM process, the over-molded silicone and core expands and seals the connector cavity, excluding all resin flow from the cavity. After curing of the resin, the molded component is heated to 420°0 F. to melt the low-melting tin/zinc alloy, thereby releasing the machined metal mandrel for low mechanical load removal. After cooling, the remaining silicone bag is removed from the cavity resulting in an insert cavity which is clean and functional.

EXAMPLE 3

An elastomer bag or balloon is molded to the internal cavity dimensions and cured using an LIM silicone, such as SHINCOR KE-1950-30 from SHINCOR Silicones. The bag or balloon is inserted into the cavity and pressed against the cavity walls either mechanically or using fluid pressure. A eutectic, low-melting tin/zinc alloy, such as Indalloy 201, is melted and poured or injected into the silicone-lined cavity and allowed to cool creating a cast-in-place hybrid mandrel. The cast-in-place hybrid mandrel is co-molded using an RTM process. During the RTM process, the elastomer and core expands and seals the connector cavity, excluding all resin flow from the cavity. After curing the resin, the molded component is heated to approximately 420° F. and the metal core is allowed to gravity-flow out of the cavity. After cooling, the remaining silicone bag is removed from the cavity resulting in a connector cavity which is clean and functional.

EXAMPLE 4

A cavity surface is coated using a soluble elastomer such as Viton™. A solvent used in the coating process is removed and the Viton™ is thermally cured. A eutectic, low-melting tin/zinc alloy such as Indalloy 201 is melted and poured into the Viton™ lined cavity and allowed to cool creating a cast-in-place hybrid mandrel. The cast-in-place hybrid mandrel is co-molded using an RTM process. During the RTM process, the elastomer and core expands and seals the connector cavity, excluding all resin flow from the cavity. After curing, the component is heated to approximately 420° F. and the metal core is allowed to gravity-flow out of the cavity. After cooling, the remaining Viton™ is removed from the cavity by dissolving the Viton™ in ketone solvents, resulting in a connector cavity which is clean and functional.

EXAMPLE 5

A metal core is cast using a eutectic, low-melting tin/zinc alloy, such as Indalloy 201. The cast core is solvent-coated with Viton™ by coating techniques, such as dipping or brushing. The solvent used in the coating process is removed and the Viton™ is thermally cured. The hybrid mandrel is inserted into an electrical connector and co-molded using an RTM process. During the RTM process, the Viton™ and core expands and seals the connector cavity, excluding all resin flow from the cavity. After curing the resin, the component is heated to approximately 420° F. and the metal core is allowed to gravity-flow out of the cavity. After cooling, the remaining Viton™ is removed from the cavity by dissolving the Viton™ in ketone solvents, resulting in a connector cavity which is clean and functional.

While the present invention has been described above in some detail, numerous variations and substitutions may be made without departing from the spirit of the invention or the scope of the following claims. Accordingly, it is to be understood that the invention has been described by way of illustration and not limitation.

The following are claimed:

1. A mandrel for a molding processes, said mandrel comprising;
   a cavity;
   a rigid inner core; and
   an expandable elastomeric outer layer that at least partially surrounds the rigid inner core, wherein the expandable elastomeric outer layer seals the cavity to prevent incursion of material that may be injected during said molding process.

2. The mandrel of claim 1, wherein the rigid inner core is at least partially composed of a low melting point material such that the rigid inner core can at least partially be removed from the cavity by melting.

3. The mandrel of claim 2, wherein the low melting point material melts at a temperature below 400° F.

4. The mandrel of claim 2, wherein the low melting point material comprises a low-melt metal or metal alloy that comprises at least one of tin, zinc, lead, silver, and bizmuth.

5. The mandrel of claim 1, wherein the elastomeric outer layer comprises an elastomer.

6. The mandrel of claim 4, wherein the elastomer is natural rubber, silicone rubber, urethane rubber, or a fluoroelastomer.

7. The mandrel of claim 1, wherein the elastomeric outer layer is composed of natural rubber, silicone rubber, urethane rubber, or fluoroelastomer.

8. An injection molding apparatus comprising:
   a tooling in which material is to be injected to form a component;
   a pre-formed part disposed within the tooling and comprising a cavity that is to be sealed; and
   a hybrid mandrel disposed within the pre-formed part cavity, the hybrid mandrel including a rigid inner core and an elastomeric outer layer that at least partially surrounds the rigid inner core, wherein the elastomeric outer layer is adapted to expand during the molding process to seal the cavity to prevent incursion of material to be injected.

9. The apparatus of claim 8, wherein the rigid inner core is at least partially composed of a low melting point material such that the rigid inner core can at least partially be removed from the cavity by melting.

10. The mandrel of claim 9, wherein the low melting point material comprises a low-melt metal or metal alloy that comprises at least one of tin, zinc, lead, silver, and bizmuth.

11. An injection molding process comprising:
    providing a hybrid mandrel including a rigid inner core and an elastomeric outer layer that at least partially surrounds the rigid inner core within a cavity of a pre-formed part;
    providing the pre-formed part along with the hybrid mandrel into a tooling;
    injecting liquid material into the tooling at an elevated temperature, the elevated temperature causing the elastomeric outer layer to expand and seal the cavity;
    curing the liquid material such that a solid component results;
    removing the solid component from the tooling;
    removing the rigid inner core using a melt-out process in which at least a portion of the rigid core is melted and flows out from the cavity; and
    removing the elastomeric outer layer.

12. The method of claim 11, further comprising forming the hybrid mandrel prior to providing the hybrid mandrel within the pre-formed part cavity.

13. The method of claim 12, wherein forming the hybrid mandrel comprises over-molding the rigid inner core with the elastomeric material.

14. The method of claim 12, wherein forming the hybrid mandrel comprises over-molding the rigid inner core with the elastomeric material.

15. The method of claim 12, wherein forming the hybrid mandrel comprises coating the rigid inner core with the elastomeric material.

16. The method of claim 11, wherein providing the hybrid mandrel comprises forming the hybrid mandrel within the pre-formed part cavity.

17. The method of claim 16, wherein forming the hybrid mandrel comprises molding an elastomer bag to inner surfaces of the cavity and then pouring melted material into the bag to form the rigid inner core.

18. The method of claim 16, wherein forming the hybrid mandrel comprises coating inner surfaces of the cavity with an elastomer, curing the elastomer to form an elastomer bag, and then pouring melted material into the elastomer bag to form the rigid inner core.

19. The method of claim 11, further comprising applying reinforcement material to the pre-formed part prior to providing the pre-formed part in the tooling.

20. The method of claim 19, injecting liquid material comprises injecting resin.

* * * * *